United States Patent
Gu et al.

(10) Patent No.: US 10,309,364 B2
(45) Date of Patent: Jun. 4, 2019

(54) EXHAUST HEAT REGENERATOR FOR VEHICLE

(71) Applicant: Hanon Systems, Daejeon (KR)

(72) Inventors: Jung Sam Gu, Daejeon (KR); Hyun Kun Shin, Daejeon (KR); Kwang Hun Oh, Daejeon (KR); Young Ha Jeon, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 169 days.

(21) Appl. No.: 15/327,132

(22) PCT Filed: Jun. 15, 2015

(86) PCT No.: PCT/KR2015/006032
§ 371 (c)(1),
(2) Date: Jan. 18, 2017

(87) PCT Pub. No.: WO2016/010266
PCT Pub. Date: Jan. 21, 2016

(65) Prior Publication Data
US 2017/0145980 A1    May 25, 2017

(30) Foreign Application Priority Data

Jul. 18, 2014  (KR) .................. 10-2014-0091203
Oct. 7, 2014   (KR) .................. 10-2014-0135284

(51) Int. Cl.
*F02N 19/10*   (2010.01)
*F01N 5/02*    (2006.01)
(Continued)

(52) U.S. Cl.
CPC ......... *F02N 19/10* (2013.01); *B60H 1/00492* (2013.01); *B60H 1/025* (2013.01);
(Continued)

(58) Field of Classification Search
CPC ...... F01N 13/08; F01N 13/14; F01N 2240/10; F01N 5/02; B60H 1/00492; B60H 1/025;
(Continued)

(56) References Cited

U.S. PATENT DOCUMENTS 8,182,936 B2 *  5/2012  Tamura ............. B60H 1/00278
                                             180/65.21
8,413,434 B2    4/2013  Prior et al.
(Continued)

FOREIGN PATENT DOCUMENTS

CN    101396953    4/2009
EP    2050938      4/2009
(Continued)

OTHER PUBLICATIONS

International Search Report dated Sep. 24, 2015 in International Application PCT/KR2015/006032.
Chinese Office Action issued in Chinese Patent Application No. 201580039296.0 dated Jun. 5, 2018.
Extended European Search Report issued in European Patent Application No. 15821457, dated Mar. 23, 2018.

*Primary Examiner* — Thai Ba Trieu
*Assistant Examiner* — Diem T Tran
(74) *Attorney, Agent, or Firm* — Norton Rose Fulbright US LLP

(57) ABSTRACT

Disclosed herein is an exhaust heat recovery apparatus for a vehicle, in which a heat accumulator has improved heat accumulation performance and heat exchange performance, whereby an engine can be rapidly warmed up in a cold start so that fuel efficiency can be enhanced, a pollutant emission rate can be reduced, and it is possible to heat a passenger compartment immediately after the engine starts.

20 Claims, 11 Drawing Sheets

(51) Int. Cl.
*F01N 13/08* (2010.01)
*F01P 3/20* (2006.01)
*F01P 7/16* (2006.01)
*F28D 20/00* (2006.01)
*F01N 13/14* (2010.01)
*B60H 1/00* (2006.01)
*B60H 1/02* (2006.01)
*B60H 1/20* (2006.01)

(52) U.S. Cl.
CPC ............... *B60H 1/20* (2013.01); *F01N 5/02* (2013.01); *F01N 13/08* (2013.01); *F01N 13/14* (2013.01); *F01P 3/20* (2013.01); *F01P 7/16* (2013.01); *F28D 20/00* (2013.01); *F01N 2240/10* (2013.01)

(58) Field of Classification Search
CPC . B60H 1/20; F02N 19/10; F28D 20/00; F01P 3/20; F01P 7/16; Y02T 10/16
USPC .................................................... 60/298, 320
See application file for complete search history.

(56) References Cited

U.S. PATENT DOCUMENTS

| | | | | |
|---|---|---|---|---|
| 8,739,520 | B2* | 6/2014 | Digele | F01N 3/05 60/298 |
| 9,631,875 | B2* | 4/2017 | Korn | F28F 1/00 |
| 2004/0182547 | A1 | 9/2004 | Birkert et al. | |
| 2009/0078400 | A1 | 3/2009 | Tamura et al. | |
| 2012/0241120 | A1 | 9/2012 | Hagel et al. | |
| 2013/0146000 | A1* | 6/2013 | Choi | F01P 11/00 123/41.14 |

FOREIGN PATENT DOCUMENTS

| | | |
|---|---|---|
| EP | 2492119 | 8/2012 |
| JP | 2009299548 A | 12/2009 |
| KR | 10-1149983 B1 | 5/2012 |
| KR | 10-2012-0080867 A | 7/2012 |
| KR | 10-2012-0133487 A | 12/2012 |
| KR | 10-2013-0065435 A | 6/2013 |
| KR | 10-2014-0077713 A | 6/2014 |
| WO | WO 2011/094371 | 8/2011 |

* cited by examiner

EXHAUST HEAT REGENERATOR FOR VEHICLE

This application is a § 371 of International Application No. PCT/KR2015/006032 filed on Jun. 15, 2015, and claims priority from Korean Patent Application Nos. 10-2014-0091203 filed on Jul. 18, 2014 and 10-2014-0135284 filed on Oct. 7, 2014.

BACKGROUND OF THE INVENTION

Field of the Invention

Exemplary embodiments of the present invention relate to an exhaust heat regenerator for a vehicle, and more particularly, an exhaust heat regenerator for a vehicle which is able to collect exhaust heat using coolant, store in a heat accumulator, and use the exhaust heat stored in the heat accumulator, during a cold start operation or for heating a passenger compartment.

Description of the Related Art

Engines for vehicles are a power generation apparatus for a vehicle which converts thermal energy generated by burning fuel into kinetic energy and transmits the kinetic energy to wheels through a drive line, thus enabling the vehicle to drive.

However, energy used to drive the vehicle is only portion of the entire generated energy. Most of the generated energy is released and lost into the air in a form of thermal energy through the surfaces of an engine and an exhaust system or by discharge of exhaust gas.

In particular, there is a large energy loss due to discharge of high-temperature exhaust gas. Given that, an exhaust heat recovery system (EHRS) has been introduced, which collects some of exhaust heat and uses it to heat a passenger compartment.

As shown in FIG. 1, a conventional exhaust heat recovery apparatus includes a heat exchanger 3 which is installed to enclose a circumferential surface of an exhaust pipe 2, and a coolant pipe 5 which circulates through the engine 1, the heat exchanger 3, and a passenger compartment heater 4.

Coolant discharged from the engine 1 passes through the heat exchanger 3 installed on the exhaust pipe 2 and thus absorbs heat from exhaust gas so that it is heated. Subsequently, when passing through the heater 4, the coolant heats air which is supplied into the passenger compartment, thus heating the passenger compartment. That is, heat of exhaust gas, which has been discharged from the engine 1 and then directly exhausted to the air through the exhaust pipe 2 in the existing technique, can be collected and used to heat the passenger compartment, whereby energy use efficiency can be improved.

Representative examples of the exhaust heat recovery apparatus which uses coolant to collect exhaust heat were proposed in Korean Patent Unexamined Publication No. 10-2012-0080867 (filed by Korea Automotive Technology Institute, and entitled "APPARATUS FOR PREHEATING COOLANT USING EXHAUST HEAT"), and in Korean Patent Unexamined Publication No. 10-2012-0133487 (filed by Dgenx Co, Ltd./Kongju National University Industry-University Cooperation Foundation, and entitled "EXHAUST HEAT RECOVERY APPARATUS FOR VEHICLE).

However, in the conventional exhaust heat recovery apparatuses, immediately after an engine starts, that is, when the temperatures of exhaust gas and the exhaust pipe 2 are not increased to a sufficient degree, an increment in the temperature of coolant is small. Thus, there is little effect on improvement in engine warm-up performance.

Furthermore, the conventional exhaust heat recovery apparatuses are problematic in that it is impossible to heat a passenger compartment immediately after the engine starts in the winter because of the above-mentioned reasons.

Moreover, a heat accumulator which is installed in the conventional exhaust heat recovery apparatuses can neither absorb a large amount of heat nor store it for a long time due to low heat exchange performance and heat accumulation performance.

SUMMARY OF THE INVENTION

An object of the present invention is to provide an exhaust heat regenerator for a vehicle in which a heat accumulator has improved heat accumulation performance and heat exchange performance, whereby an engine can be rapidly warmed up in a cold start so that fuel efficiency can be enhanced, a pollutant emission rate can be reduced, and it is possible to heat a passenger compartment immediately after the engine starts.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, an exhaust heat regenerator for a vehicle, including: a coolant discharge pipe (220) coupled at a first end thereof to an exhaust-heat-recovery heat exchanger (300) and at a second end thereof to a passenger compartment heater (400); a coolant bypass pipe (240) coupled at a first end thereof to a portion of the coolant discharge pipe (220) that is adjacent to the exhaust-heat-recovery heat exchanger (300) and at a second end thereof to a portion of the coolant discharge pipe (220) that is adjacent to the passenger compartment heater (400); a flow path control valve (500) installed on the first or second end of the coolant bypass pipe (240) and configured to control a flow path of coolant; and a heat accumulator (600, 700) installed on the coolant bypass pipe (240).

The exhaust heat regenerator in accordance with another aspect of the present invention may further include: a first coolant temperature sensor (910) installed on the coolant discharge pipe (220) and measuring a temperature of the coolant discharged from the exhaust-heat-recovery heat exchanger (300); a second coolant temperature sensor (920) installed on the coolant bypass pipe (240) and measuring a temperature of the coolant discharged from the heat accumulator (600, 700); and an electronic control unit (800) controlling operation of the flow path control valve (500) using measured values of the first and second coolant temperature sensors (910) and (920).

In the exhaust heat regenerator in accordance with another aspect of the present invention, the electronic control unit (800) may determine that the vehicle is in an engine warm-up operation when the measured value of the first coolant temperature sensor (910) is less than the measured value of the second coolant temperature sensor (920), and control the flow path control valve (500) such that the coolant discharge pipe (220) is closed and the coolant bypass pipe (240) opens so that all of the coolant passes through the heat accumulator (600, 700).

In the exhaust heat regenerator in accordance with another aspect of the present invention, the electronic control unit (800) may determine that the vehicle is in a post warm-up operation when the measured value of the first coolant temperature sensor (910) is equal to or greater than the measured value of the second coolant temperature sensor (920), and control the flow path control valve (500) such that the coolant discharge pipe (220) opens and the coolant bypass pipe (240) is closed so that all of the coolant passes through the passenger compartment heater (400) without passing through the heat accumulator (600, 700).

In the exhaust heat regenerator in accordance with another aspect of the present invention, the electronic control unit (800) may determine that the vehicle is in a driving operation when the measured value of the first coolant temperature sensor (910) is equal to or greater than a preset thermostat opening temperature, and control the flow path control valve (500) such that both the coolant discharge pipe (220) and the coolant bypass pipe (240) open so that the coolant flows both through a path that does not passes through the heat accumulator (600, 700) and through a path that passes through the heat accumulator (600, 700).

In the exhaust heat regenerator in accordance with another aspect of the present invention, the heat accumulator (600) may include: a heat exchanger (610) via which the coolant passes; an inner casing (620) in which the heat exchanger (610) is installed; an outer casing (630) in which the inner casing (620) is installed; and a heat storage material (640) charged into a space between the heat exchanger (610) and the inner casing (620).

The exhaust heat regenerator in accordance with another aspect of the present invention may further include an insulation space (650) formed between the inner casing (620) and the outer casing (630).

The exhaust heat regenerator in accordance with another aspect of the present invention may further include a sealing member (660) installed on an upper end of an opening of the outer casing (630), the opening being formed to allow the inner casing (620) to be installed in the outer casing (630).

In the exhaust heat regenerator in accordance with another aspect of the present invention, an inlet port (611) and an outlet port (612) of the heat exchanger (610) may protrude outward through a cover (631) of the outer casing (630).

In the exhaust heat regenerator in accordance with another aspect of the present invention, a heat storage material injection port (621) formed on the inner casing (620) may protrude outwards through a cover (631) of the outer casing (630).

In the exhaust heat regenerator in accordance with another aspect of the present invention, the heat accumulator (700) may include: a heat exchanger (710) via which the coolant passes; an inner casing (720) in which the heat exchanger (710) is housed; a heat storage material charged between the heat exchanger (710) and the inner casing (720); an outer casing (740) housing the inner casing (720) therein; and an insulation space formed between the inner casing (720) and the outer casing (740), wherein the heat exchanger (710) may include a plurality of planar tubes (711) which are stacked to communicate with each other, and each of which includes an upper plate (711a) and a lower plate (711b).

In the exhaust heat regenerator in accordance with another aspect of the present invention, a cooling fin (712) may be formed between the planar tubes (711).

In the exhaust heat regenerator in accordance with another aspect of the present invention, a connection part (711c) including an inlet port (711ca) and an outlet port (711cb) may protrude from each of the upper and lower plates (711a) and (711b) of the planar tubes (711), and wherein upper and lower ones of the planar tubes may be stacked in such a way that the connection parts (711c) are connected to each other.

In the exhaust heat regenerator in accordance with another aspect of the present invention, a baffle (712a) may be formed on each of the planar tubes (711) and block a space between the inlet port (711ca) and the outlet port (711cb).

In the exhaust heat regenerator in accordance with another aspect of the present invention a plurality of circular beads (712b) may be formed in both spaces of the planar tube (711) that are partitioned from each other by the baffle (712a).

In the exhaust heat regenerator in accordance with another aspect of the present invention, a curved bead (712c) may be formed in the planar tube (711) at a junction between both spaces of the planar tube (711) that are partitioned from each other by the baffle (712a).

In the exhaust heat regenerator in accordance with another aspect of the present invention, a tap (711da) and a fixing depression (711db) into which the tap (711da) is inserted may be respectively formed in the upper plate (711a) and the lower plate (711b) of the planar tube (711).

In the exhaust heat regenerator in accordance with another aspect of the present invention, a first flange (750) may be formed on an upper surface of the heat exchanger (710) and include pipe insert holes (751) and (752) connected to the inlet port (711ca) and the outlet port (711cb), and a second flange (760) may be formed on a lower surface of an inner casing cover (725) covering an upper opening of the inner casing (720) and include an inlet pipe (726) and an outlet pipe (727), wherein the first flange (750) and the second flange (760) may be coupled to each other during an assembly of the inner casing cover (725) and form a coolant inlet path and a coolant outlet path.

In the exhaust heat regenerator in accordance with another aspect of the present invention, a vacuum insulation panel (730) enclosing the inner casing (720) may be installed in the insulation space.

In the exhaust heat regenerator in accordance with another aspect of the present invention, a rib (712) may protrude from an outer circumferential surface of the inner casing (720) and come into contact with an inner circumferential surface of the vacuum insulation panel (730) or an inner circumferential surface of the outer casing (740).

In an exhaust heat regenerator for a vehicle according to the present invention, the heat accumulation performance and heat exchange performance of a heat accumulator are enhanced so that the heat accumulator can absorb a large amount of heat from the coolant and store it for a long period of time. When needed, heat that has been stored in the heat accumulator can be emitted through coolant.

Furthermore, in the exhaust heat regenerator for vehicle according to the present invention, immediately after an engine starts, the coolant can be heated using heat that has been stored in the heat accumulator. Thus, the engine can be rapidly warmed up, whereby a fuel consumption rate at an initial stage of the engine start can be reduced so that the fuel efficiency can be enhanced.

Moreover, in the exhaust heat regenerator according to the present invention, as the engine is rapidly warmed up, the air pollutant emission rate, which is typically markedly increased at the initial stage of the engine start, can be reduced.

In addition, coolant that has been heated while passing through the heat accumulator flows via a passenger compartment heater. Therefore, it is possible to heat the passenger compartment even immediately after the engine starts.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

The present invention will now be described in detail based on embodiments. The present invention may, however, be embodied in many different forms and should not be construed as being limited to only the embodiments set forth herein, but should be construed as covering modifications, equivalents or alternatives falling within ideas and technical scopes of the present invention. The size of each element shown in the attached drawings, the thickness of lines illustrating the element, etc. may be exaggeratedly expressed for the sake of understanding the present invention.

The terms and words used for elements in the description of the present invention have been defined based on the functions of the elements in the present invention. The terms and words may be changed depending on the intention or custom of users or operators, so that they must be defined based on the whole content of the specification of the present invention.

Hereinafter, an exemplary embodiment of the present invention will be described in detail with reference to the attached drawings.

Figure 1:
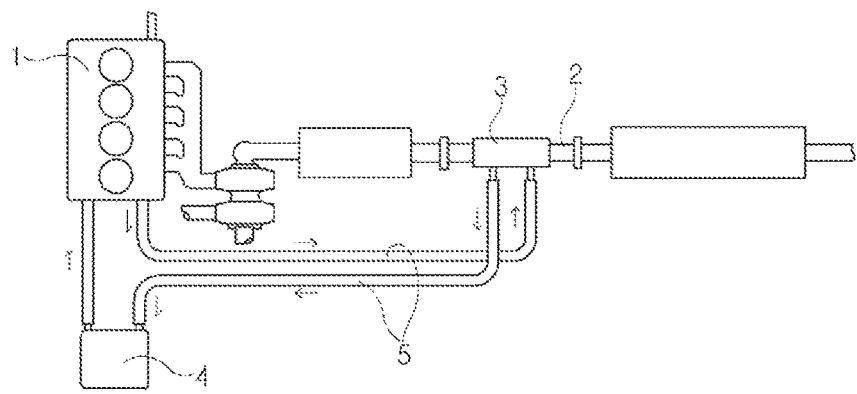
FIG. 1 is a view showing the configuration of an exhaust heat recovery apparatus for a vehicle according to a conventional technique.
Figure 2:
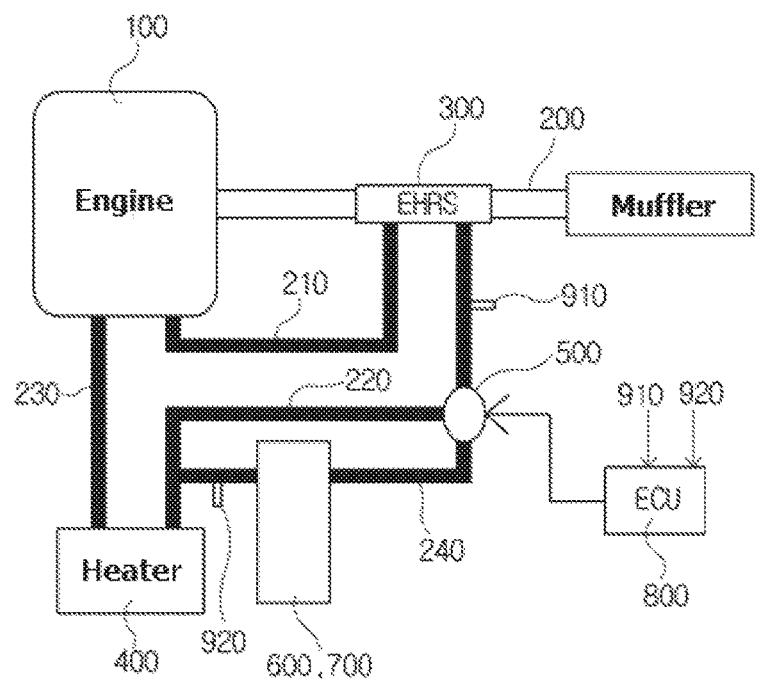
FIG. 2 is a view illustrating an exhaust heat regenerator for a vehicle according to the present invention.

FIG. 2 is a view showing the configuration of an exhaust heat regenerator for a vehicle according to the present invention. The exhaust heat regenerator according to the present invention includes a coolant discharge pipe 220 which couples a passenger compartment heater 400 with an exhaust-heat-recovery heat exchanger installed on an exhaust pipe 200 of an engine 100, a coolant bypass pipe 240 which is installed on the coolant discharge pipe 220 so as to form a dual path, a flow path control valve 500 which is installed on a junction between the coolant discharge pipe 220 and the coolant bypass pipe 240 and controls a flow path of coolant, and a heat accumulator 600, 700 which is installed on the coolant bypass pipe 240.

The exhaust-heat-recovery heat exchanger 300 is installed in a form in which it encloses the circumference of the exhaust pipe 200 coupled to the engine 100. A muffler is installed on an end of the exhaust pipe 200.

An inlet coolant pipe 210 is coupled between the engine 100 and the exhaust-heat-recovery heat exchanger 300. The coolant discharge pipe 220 is coupled between the exhaust-heat-recovery heat exchanger 300 and the passenger compartment heater 400.

A coolant return pipe 230 is coupled between the passenger compartment heater 400 and the engine 100.

Discharged from the engine 100, coolant is returned to the engine 100 via the exhaust-heat-recovery heat exchanger 300 and the passenger compartment heater 400. Thus, the coolant can be used, using heat of exhaust gas, as a heat source for heating the passenger compartment.

Both ends of the coolant bypass pipe 240 are respectively coupled to a first portion of the coolant discharge pipe 220 and a second portion thereof which is disposed at a more downstream side than the first portion. In this way, the path along which the coolant is supplied to the passenger compartment heater 400 can be configured to form two paths.

The flow path control valve 500 is installed on the junction between the coolant discharge pipe 220 and the coolant bypass pipe 240.

The operation of the flow path control valve 500 is controlled by an electronic control unit 800.

Depending on the operating conditions of the flow path control valve 500, only the coolant discharge pipe 220 may open, only the coolant bypass pipe 240 may open, or both the coolant discharge pipe 220 and the coolant bypass pipe 240 may open.

A first coolant temperature sensor 910 and a second coolant temperature sensor 920 are respectively installed on a rear end of the exhaust-heat-recovery heat exchanger 300 of the coolant discharge pipe 220 and a rear end of the heat accumulator 600, 700 of the coolant bypass pipe 240.

Coolant temperature values measured by the first and second coolant temperature sensors 910 and 920 are transmitted to the electronic control unit 800.

According to an embodiment of the present invention, although not limited to this, the electronic control unit 800 may include an engine control unit that controls the operation of the engine 100.

The electronic control unit 800 controls the flow path control valve 500 through a preset program or the like using a discharge coolant temperature value of the exhaust-heat-recovery heat exchanger 300 and a discharge coolant temperature value of the heat accumulator 600, 700 which are respectively measured by the first coolant temperature sensor 910 and the second coolant temperature sensor 920.

The electronic control unit 800 controls the flow path control valve 500 in an engine warm-up operation, a post warm-up operation, and a driving operation.

Figure 4:
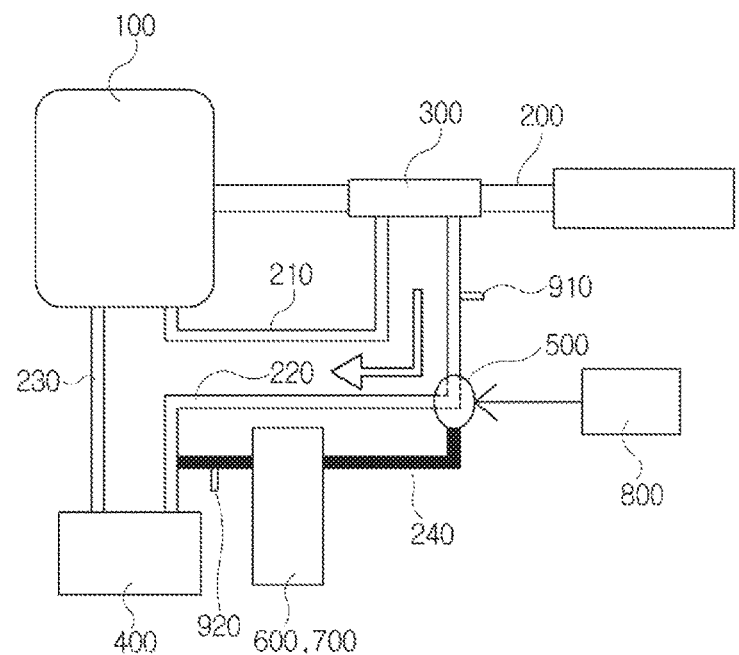
FIG. 4 is a view illustrating the operation of the present invention before coolant is cooled by a radiator after the engine warm-up operation.
Figure 5:
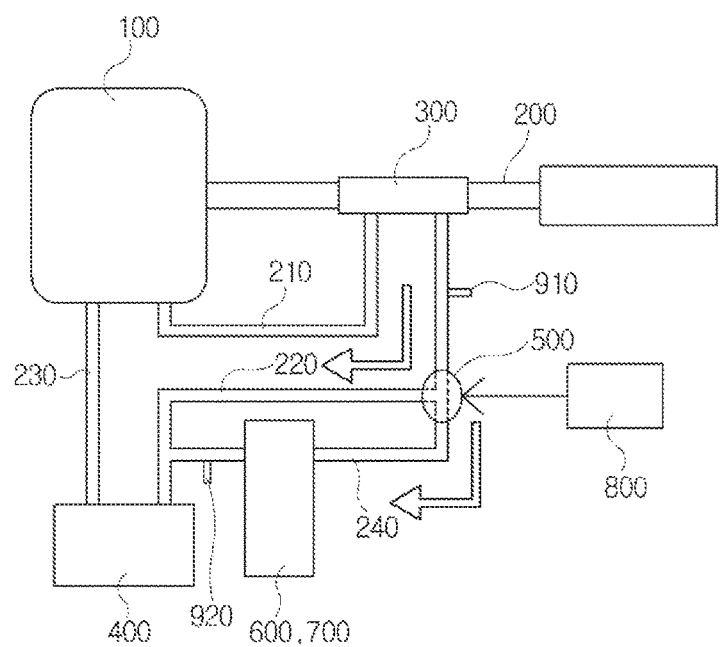
FIG. 5 is a view illustrating the operation of the present invention during a driving operation in which the coolant is cooled by the radiator.

The electronic control unit 800 controls the flow path control valve 500 such that: in the warm-up operation immediately after the engine 100 starts, only the coolant bypass pipe 240 opens (refer to FIG. 3); in the post warm-up operation, only the coolant discharge pipe 220 opens (refer to FIG. 4); and, thereafter, in the driving operation, both the coolant discharge pipe 220 and the coolant bypass pipe 240 open (refer to FIG. 5).

The electronic control unit 800 recognizes an engine start from an ON signal of an engine start switch and determines that the engine 100 is in the warm-up operation when an outlet temperature value of the exhaust-heat-recovery heat exchanger 300 that is measured by the first coolant temperature sensor 910 is less than an outlet temperature value of the heat accumulator 600, 700 that is measured by the second coolant temperature sensor 920.

Figure 3:
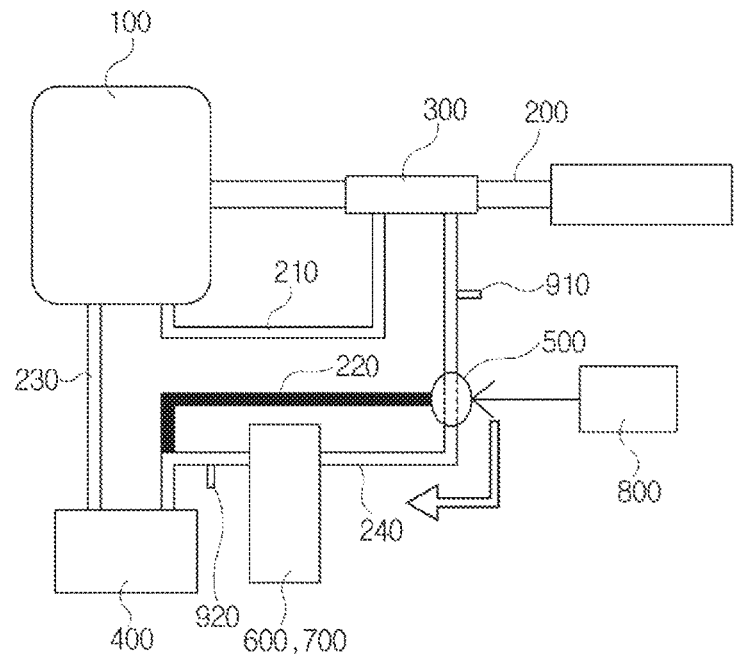
FIG. 3 is a view illustrating the operation of the present invention during an engine warm-up operation.

As shown in FIG. 3, after the engine starts, when the outlet temperature value of the exhaust-heat-recovery heat exchanger 300 that is measured by the first coolant temperature sensor 910 is less than the outlet temperature value of the heat accumulator 600, 700 that is measured by the second coolant temperature sensor 920, it is determined that the engine 100 is in the warm-up operation. In this case, the electronic control unit 800 operates the flow path control valve 500 such that the coolant discharge pipe 220 is closed and only the coolant bypass pipe 240 opens. Here, heat that has been accumulated during a preceding driving operation has been stored in the heat accumulator 600, 700.

Therefore, as the coolant path is controlled as described above, coolant discharged from the exhaust-heat-recovery heat exchanger 300 can absorb heat from the heat accumulator 600, 700 while passing through the heat accumulator 600, 700 and thus be reheated. The coolant heated while passing through the heat accumulator 600, 700 passes through the passenger compartment heater 400 and returns to the engine 100 through the coolant return pipe 230.

As mentioned above, the coolant is heated not only by the engine 100 and the exhaust-heat-recovery heat exchanger 300 but also by the heat accumulator 600, so that the rate at which the temperature of the coolant rises is increased. Thus, an engine warm-up period can be reduced. Consequently, during initial cold driving after the engine starts, there is no need to perform a control operation in which the RPM of the engine is increased to reduce the warm-up period by artificially increasing a fuel supply rate according to an engine control logic. As a result, a fuel consumption rate is reduced, whereby the fuel efficiency can be enhanced.

Furthermore, the coolant that has absorbed heat from the heat accumulator 600, 700 passes through the passenger compartment heater 400 and thus is able to heat air which is supplied into the passenger compartment. Hence, it is possible to heat the passenger compartment even immediately after the engine starts. That is, even in the winter, it is possible to rapidly heat the passenger compartment immediately after the engine starts.

When the outlet temperature value of the exhaust-heat-recovery heat exchanger 300 measured by the first coolant temperature sensor 910 is equal to or greater than the outlet temperature value of the heat accumulator 600, 700 measured by the second coolant temperature sensor 920, it is determined that the engine is in the post warm-up operation.

As the operation of the engine 100 continues and thus the temperature of the coolant increases, when the outlet temperature value of the exhaust-heat-recovery heat exchanger 300 measured by the first coolant temperature sensor 910 becomes equal to or greater than the outlet temperature value of the heat accumulator 600, 700 measured by the second coolant temperature sensor 920, it is determined that the engine is in the post warm-up operation after the warm-up operation has been completed.

In this case, as shown in FIG. 4, the electronic control unit 800 operates the flow path control valve 500 such that only the coolant discharge pipe 220 opens and the coolant bypass pipe 240 is closed. In this operation, because the heat accumulator 600, 700 can no longer heat the coolant, the flow path control valve 500 is controlled such that the supply of coolant to the heat accumulator 600, 700 is interrupted so that all of the coolant flows to the passenger compartment heater 400 through the coolant discharge pipe 220. Consequently, most heat of coolant that is heated by the engine 100 and the exhaust-heat-recovery heat exchanger 300 can be used to heat the passenger compartment.

Lastly, when the outlet temperature value of the exhaust-heat-recovery heat exchanger 300 measured by the first coolant temperature sensor 910 is a thermostat opening temperature or more, it is determined that the engine 100 is in the driving operation. The thermostat opening temperature is generally approximately 85° C. In the present invention, the thermostat opening temperature is set to an appropriate value slightly higher than 85° C. and used as a reference value for determining whether the engine 100 is in the driving operation (whether surplus heat is generated).

This thermostat opening temperature is stored in a memory unit of the electronic control unit 800.

As the driving time passes, the temperature of the coolant further increases. Then, the thermostat opens, so that the coolant circulates not only through the aforementioned heating circulation path but also through a cooling circulation path (not shown) along which the coolant circulates between the engine 100 and a radiator. The driving operation is an operation in which as general driving of the vehicle is performed, it is necessary to cool the coolant, that is, surplus heat is generated from the coolant. In other words, the driving operation is an operation in which the surplus heat can be stored in the heat accumulator 600, 700.

As shown in FIG. 5, when the outlet temperature value of the exhaust-heat-recovery heat exchanger 300 measured by the first coolant temperature sensor 910 is the thermostat opening temperature or more, the electronic control unit 800 determines that the engine 100 is in the driving operation, and thus operates the flow path control valve 500 to open both the coolant discharge pipe 220 and the coolant bypass pipe 240.

As the coolant flows through both the coolant discharge pipe 220 and the coolant bypass pipe 240, heat absorbed from the engine 100 and the exhaust-heat-recovery heat exchanger 300 can not only be used to heat the passenger compartment but can also be accumulated in the heat accumulator 600, 700.

Heat that is accumulated in the heat accumulator 600, 700 in the driving operation is stored in the heat accumulator 600, 700 during a vehicle operation stop (engine stop) state. Subsequently, when the engine is started to begin the operation of the vehicle, the stored heat is used for rapidly warming up the engine 100 and immediately heating the passenger compartment.

Figure 6:
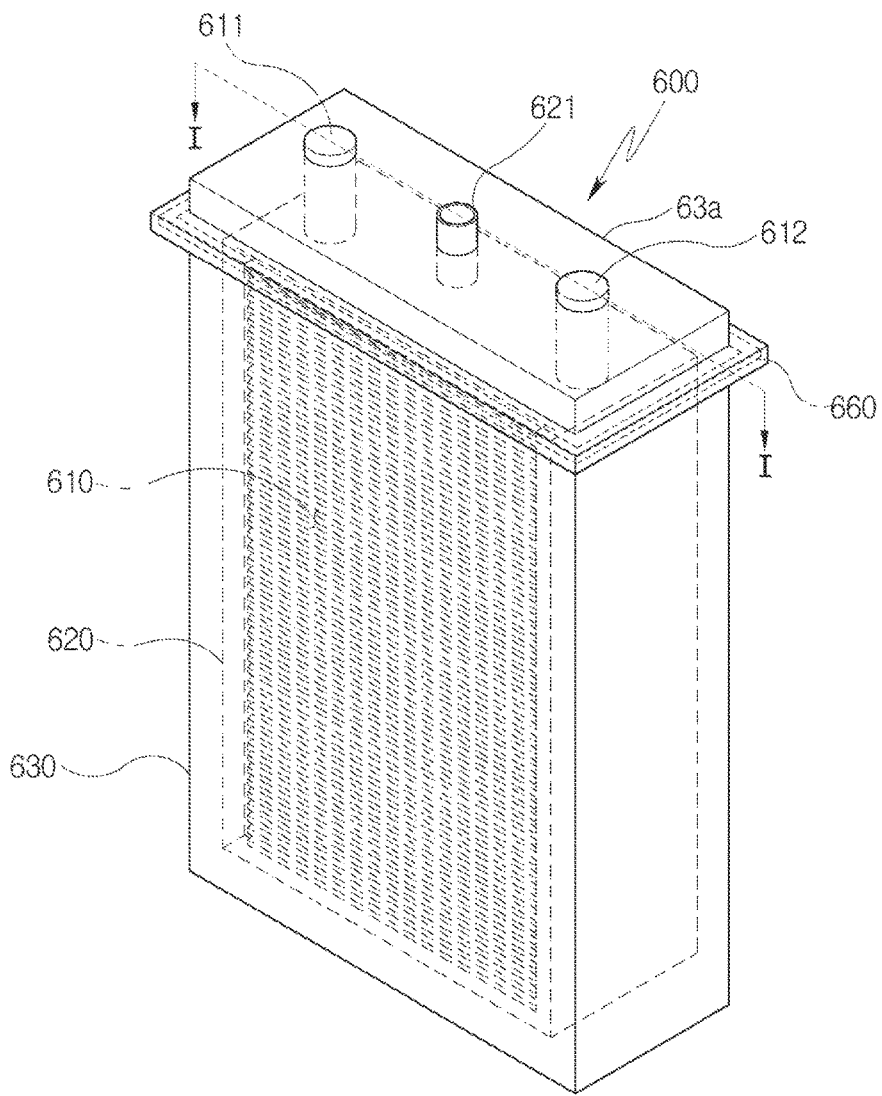
FIG. 6 is a perspective view of a heat accumulator installed in an exhaust heat regenerator for a vehicle according to a first embodiment of the present invention.
Figure 7:
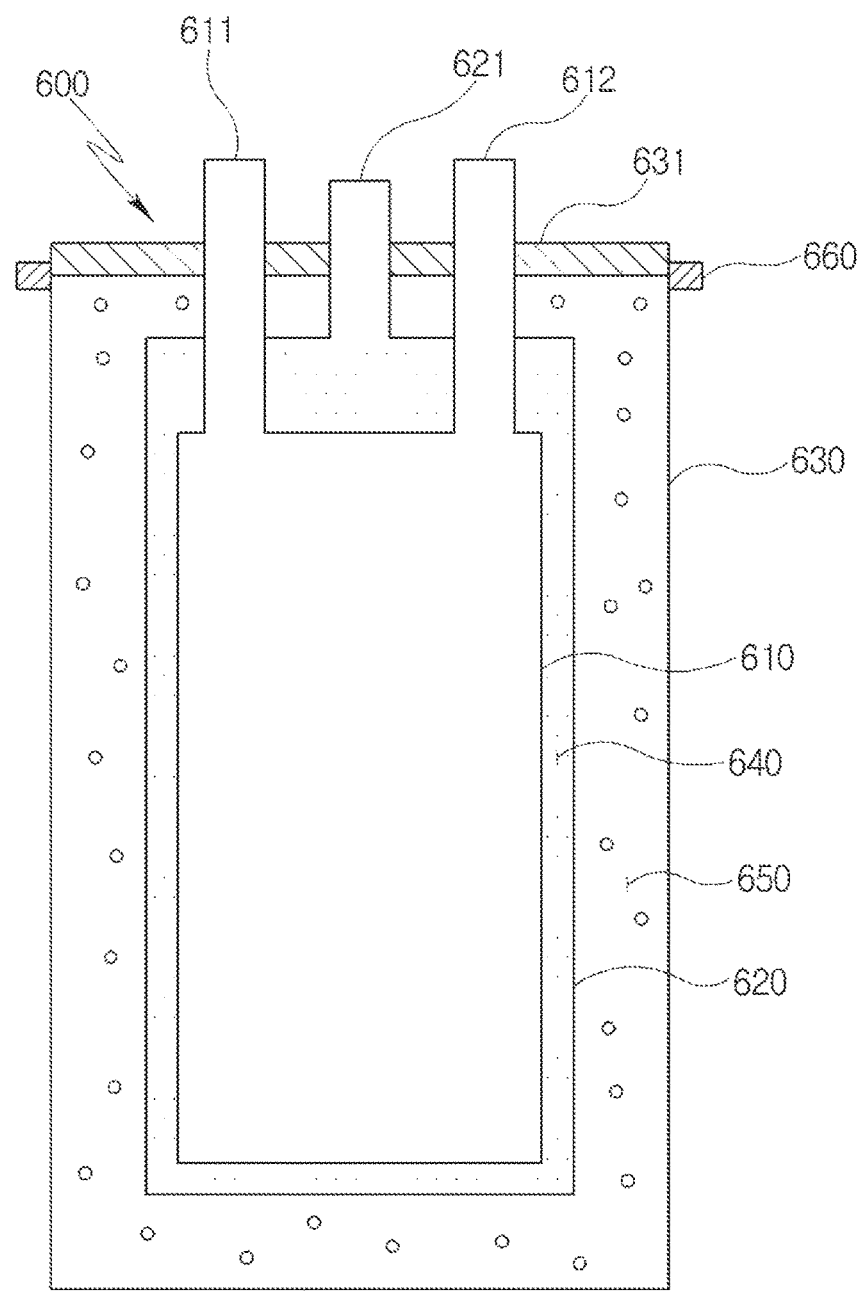
FIG. 7 is a sectional view taken along line I-I of FIG. 6 and is a schematic sectional view of the heat accumulator.

As shown in FIGS. 6 and 7, the heat accumulator 600 installed in the exhaust heat regenerator for vehicles according to a first embodiment of the present invention includes an accumulation heat exchanger 610 through which coolant discharged from the exhaust-heat-recovery heat exchanger 300 passes, an inner casing 620 which encloses the accumulation heat exchanger 610 with a space between it and the heat exchanger 610, and an outer casing 630 which encloses the inner casing 620 with a space between it and the inner casing 620.

The heat exchanger 610 includes an inlet port 611 and an outlet port 612 on both sides of an upper surface thereof. The inlet port 611 and the outlet port 612 are respectively coupled to both ends of the heat accumulator 600 of the coolant bypass pipe 240, thus forming a coolant path which passes through the accumulation heat exchanger 610.

A heat storage material injection port 621 is formed on a central portion of an upper surface of the inner casing 620.

The outer casing 630 includes a cover 631 which covers an upper surface thereof. Through holes are formed in the cover 631 at positions that correspond to the inlet port 611 and the outlet port 612 of the accumulation heat exchanger 610 and the heat storage material injection port 621 of the inner casing 620.

Thus, the inlet port 611, the outlet port 612, and the heat storage material injection port 621 protrude upward from the cover 631 through the respective through holes.

A sealing member 660 made of rubber is installed on a peripheral surface of an upper end of the outer casing 630 so as to seal space between the outer casing 630 and the cover 631.

Space defined between the accumulation heat exchanger 610 and the inner casing 620 is filled with a heat storage material 640.

The heat storage material 640 is injected into the internal space of the inner casing 620 through the heat storage material injection port 621. According to an embodiment of the present invention, although not limited to this, a phase change material (PCM), molten salt, or the like may be used as the heat storage material 640.

Since the heat storage material 640 encloses the heat exchanger 610, when coolant discharged from the exhaust-heat-recovery heat exchanger 300 passes through the accumulation heat exchanger 610, heat of the coolant is transferred to the heat storage material 640 and stored therein.

An insulation space 650 is defined between the inner casing 620 and the outer casing 630. According to an embodiment of the present invention, although not limited to this, the insulation space 650 may be an empty space or a vacuum space, or be filled with an insulator. As the insulator, aerogel which is an advanced material insulator may be used, or a vacuum insulation panel may be installed.

By the insulation space 650 including the insulator, heat transfer between the inner casing 620 and the outer casing 630 is restricted as much as possible so that heat stored in the heat storage material 640 can be retained for a long time.

As such, the heat accumulator 600 absorbs heat from coolant that has received heat from exhaust gas while passing through the exhaust-heat-recovery heat exchanger 300, and stores the heat therein.

The heat accumulator 600 can effectively absorb and store heat from the coolant and retain the stored heat for a long time due to a double casing structure including the inner casing 610 and the outer casing 620, the high heat storage performance of the heat storage material 640, and the high insulation performance of the insulation space 650.

The present invention is able to store thermal energy, which is released into the air while the vehicle is driven, and makes it possible to use the stored heat when needed.

Therefore, during a cold start in the winter, the fuel consumption rate can be reduced, and a pollutant emission rate can also be reduced. In addition, it is possible to heat the passenger compartment immediately after the engine starts.

Figure 8:
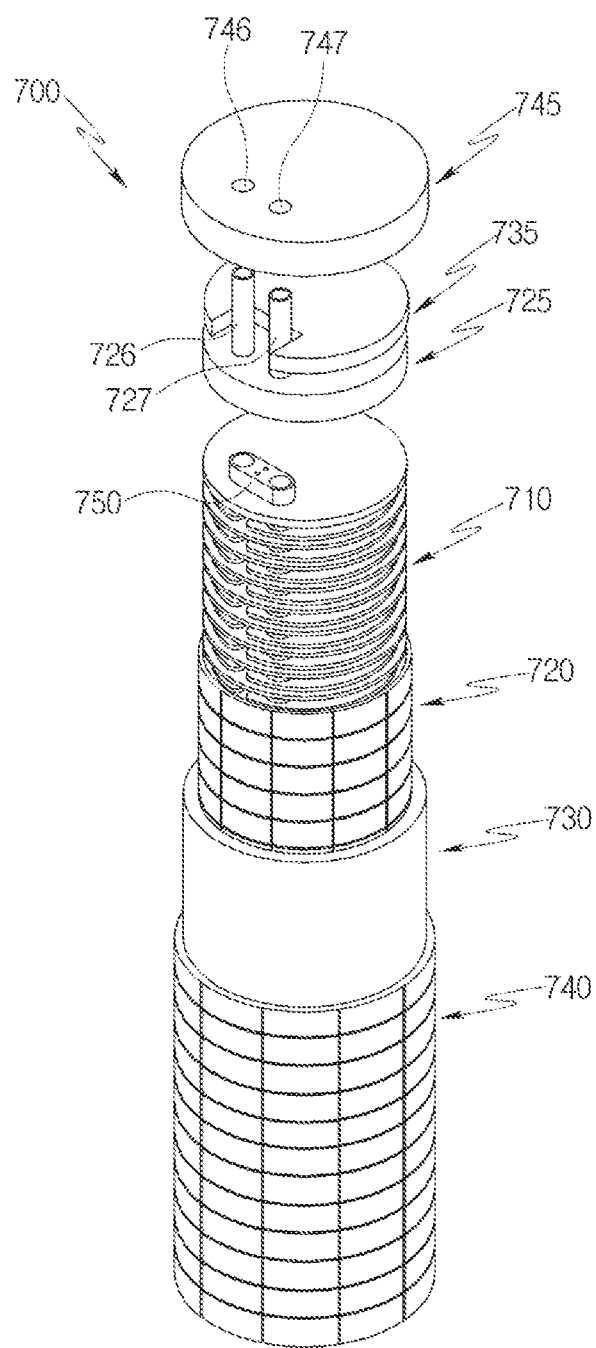
FIG. 8 is an exploded perspective view illustrating the configuration of a heat accumulator installed in an exhaust heat regenerator for a vehicle according to a second embodiment of the present invention.

FIG. 8 is an exploded perspective view illustrating the configuration of a heat accumulator installed in the exhaust heat regenerator for vehicles according to a second embodiment of the present invention. As shown in the drawing, the heat accumulator 700 of the exhaust heat regenerator for vehicles according to the present embodiment includes a heat exchanger 710 through which coolant passes, an inner casing 720 in which the heat exchanger 710 is housed, a heat storage material which is charged into space between the heat exchanger 710 and the inner casing 720, an outer casing 740 which houses the inner casing 720, and an insulation space which is formed between the inner casing 720 and the outer casing 740.

Figure 9:
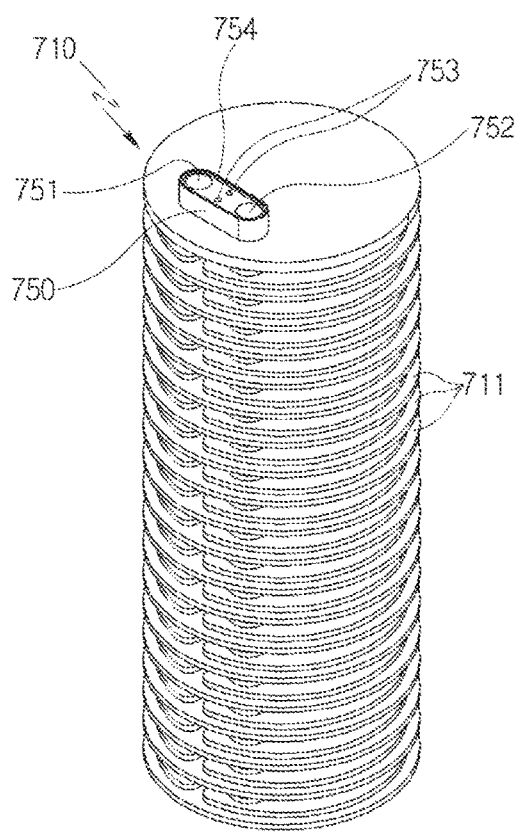
FIG. 9 is a perspective view of a heat exchanger constituting the heat accumulator shown in FIG. 8.
Figure 10:
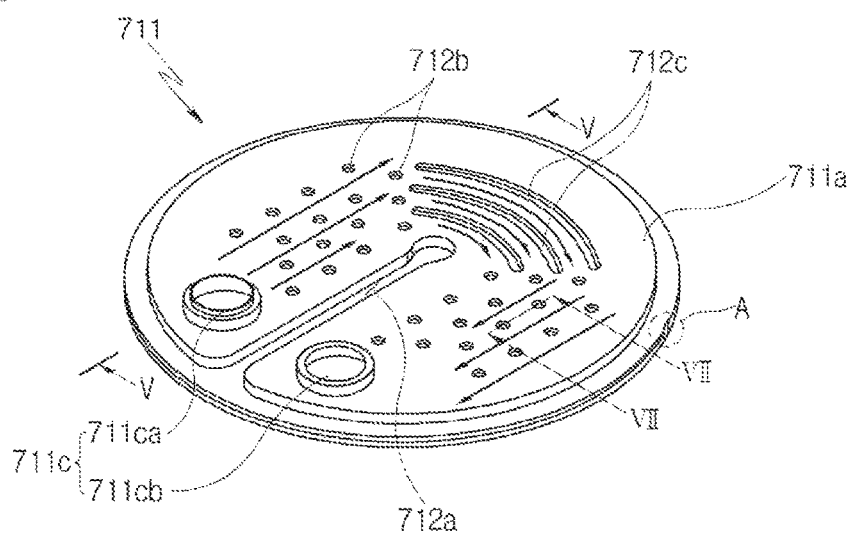
FIG. 10 is a perspective view of a planar tube constituting the heat exchanger of FIG. 9.
Figure 11:
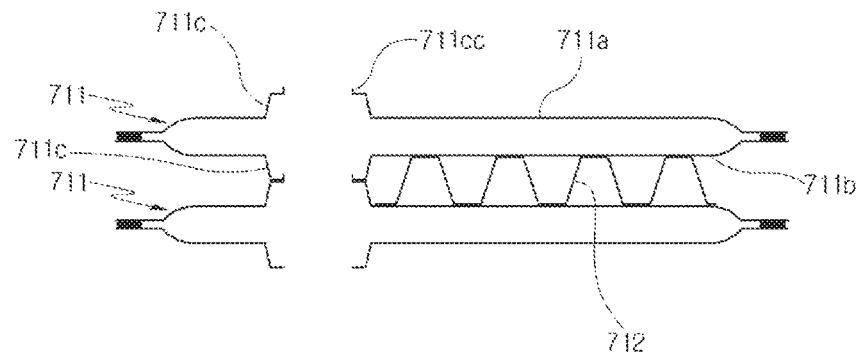
FIG. 11 is a sectional view taken along line V-V of FIG. 10 and is a sectional view of the planar tube, showing a structure in which planar tubes having the same structure are stacked.
Figure 12:
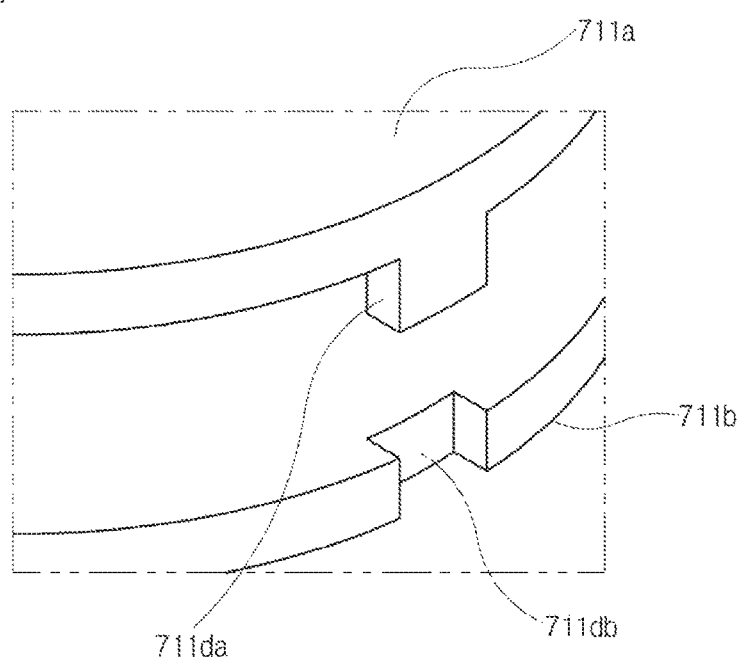
FIG. 12 is an enlarged view of portion A of FIG. 10 and is a perspective view illustrating the structure of a coupling part between an upper plate and a lower plate of the planar tube.

As shown in FIG. 9, the heat exchanger 710 is configured by stacking a plurality of planar tubes 711. The heat exchanger 710 is manufactured in a cylindrical shape so as to minimize a heat exchange area between it and the outside in an insulated state. Therefore, each of the planar tubes 711 has a disk shape. The planar tubes 711 that are stacked on top of one another communicate with each other so that coolant can flow through all of the planar tubes 711.

The structure of the planar tube 711 will be described with reference to FIGS. 10 to 13. As shown in FIGS. 10 to 13, the planar tube 711 is formed by joining an upper plate 711*a* and a lower plate 711*b* to each other. Circumferential edges of the upper and lower plates 711*a* and 711*b* are joined to each other by brazing.

A space is formed between the upper plate 711*a* and the lower plate 711*b* so that coolant can flow through the space. A circular connection part 711*c* protrudes from each of the upper and lower plates 711*a* and 711*b*.

The connection part 711*c* comprises a pair of left and right connection parts disposed adjacent to each other. One of the connection parts 711*c* is used as a coolant inlet port 711*ca*, and the other is used as a coolant outlet port 711*cb*.

When the planar tubes 711 are stacked, the corresponding connection parts 711*c* of upper and lower planar tubes are coupled to each other. For this, an insert end 711*cc* protrudes from one of the inlet port 711*ca* or the outlet port 711*cb* so that when the planar tubes 711 are stacked, the insert end 711*cc* is fitted into the corresponding connection part 711*c*. The connection parts 711*c* coupled to each other are brazed so as to prevent water leakage.

Due to the height to which the connection parts 711*c* protrude, space is defined between the upper and lower planar tubes 711 that are stacked. A cooling fin 712 for increasing a heat exchange area of the planar tubes 711 is formed in the space. The cooling fin 712 may be formed on the upper planar tube, the lower planar tube, or both. Spaces are defined between portions of the cooling fin 712.

A tap 711*da* and a fixing depression 711*db* are formed in the upper plate 711*a* and the lower plate 711*b* so that when the upper plate 711*a* and the lower plate 711*b* are joined to each other, they can be maintained in a temporarily fixed state. In this embodiment, a plurality of taps 711*da* and a plurality of fixing depressions 711*db* are formed in the circumferential edges of the upper and lower plates 711*a* and 711*b*. The taps 711*da* and the fixing depressions 711*db* may be alternately formed in both the upper plate 711*a* and the lower 711*b*. The upper plate 711*a* and the lower plate 711*b* can be maintained in the temporarily fixed state by fitting each tap 711*da* into the corresponding fixing depression 711*db*. Therefore, a brazing operation can be facilitated.

A baffle 712a, circular beads 712b, a curved bead 712c protrude from each of the upper and lower plates 711a and 711b toward the internal space of the planar tube 711.

Figure 13:
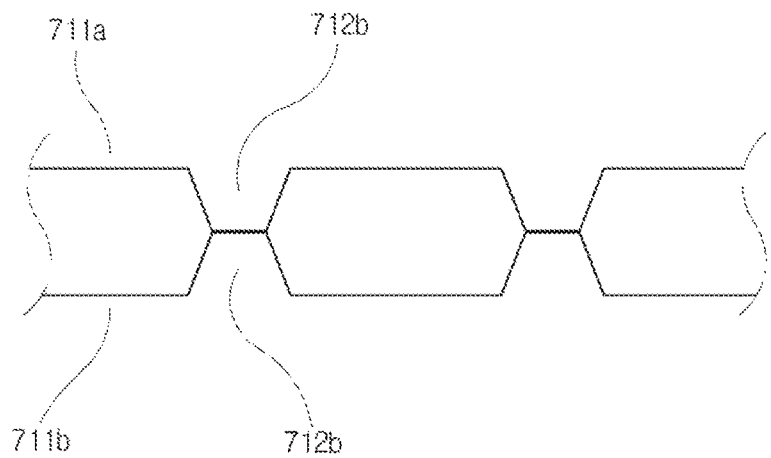
FIG. 13 is a sectional view taken along line VII-VII of FIG. 10 and is a sectional view illustrating an internal shape of the planar tube.

FIG. 13 is a sectional view showing the circular beads 712b formed on the upper and lower plates 711a and 711b. Likewise, the baffle 712a and the curved bead 712c are formed in such a way that portions thereof protruding into the internal space from the upper and lower plates 711a and 711b come into contact with each other.

When viewed in a plan view (refer to FIG. 10), the baffle 712a extends a predetermined length inward from the circumferential edge of the planar tube 711 through space between the coolant inlet port 711ca and the coolant outlet port 711cb. That is, the baffle 712a partitions the internal space of the planar tube 711 into a portion into which coolant is drawn and a portion from which coolant is discharged. The baffle 712a thus functions to prevent coolant drawn into the planar tube 711 from directly flowing from the inlet port 711ca to the outlet port 711ca and make the coolant be discharged after passing through a predetermined path around the baffle 712a (the arrows indicate the flow direction of coolant). Thereby, a sufficient length of a heat exchange path can be ensured.

The circular beads 712b are formed in the internal space on each of both sides of the baffle 712a. The circular beads 712b function as a plurality of resistance (collision) bodies in the flow of coolant at positions spaced apart from each other at regular intervals. A turbulent coolant flow repeatedly collides with the circular beads 712b and forms a streamlined flow behind the circular beads 712b, whereby an overall stable laminar flow can be formed. As the flow of coolant becomes smooth, drawn coolant can generally uniformly flow in the planar tube 711.

The curved bead 712c is formed in a curved form between the coolant inflow space and the coolant discharge space that are partitioned from each other by the baffle 712a and functions to smoothly connect the flow of coolant from the coolant inflow space to the coolant discharge space.

Due to the baffle 712a, the circular beads 712b, and the curved bead 712c, coolant can generally uniformly and smoothly flow in the planar tube 711 in a stable flow form. Thereby, heat exchange efficiency can be enhanced, and there is an effect of reducing vibration and noise because of the flow of coolant.

Figure 14:
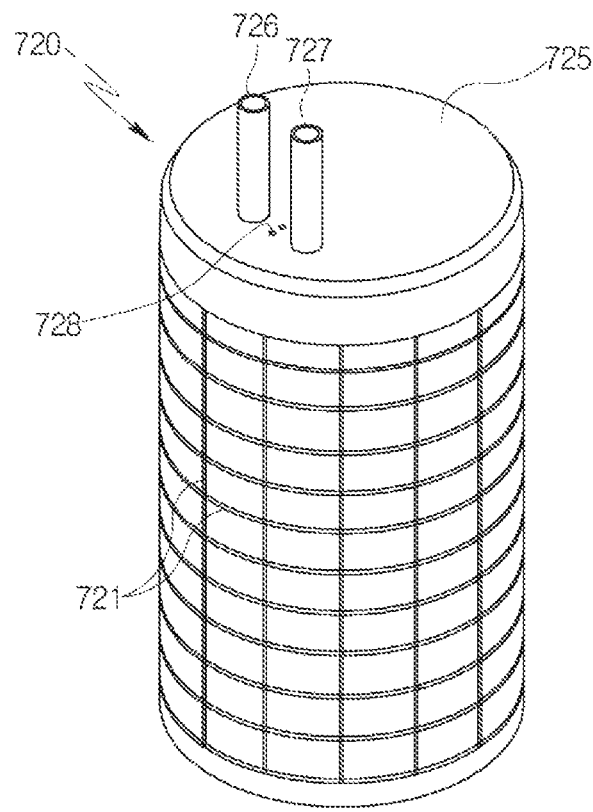
FIG. 14 is a perspective view of an inner casing constituting the heat accumulator shown in FIG. 8.

As shown in FIGS. 8 and 14, the heat exchanger 710 is housed in the inner casing 220. The inner casing 720 has a cylindrical shape and is open on an upper end thereof to allow the heat exchanger 710 to be inserted thereinto. The inner casing 720 is provided with an inner casing cover 725 which covers the opening of the inner casing 720 after the heat exchanger 710 has been inserted thereinto. According to an embodiment of the present invention, although not limited to this, the inner casing 720 and the inner casing cover 725 are made of plastic.

An inlet pipe 726 and an outlet pipe 727 are provided on the inner casing cover 725 so that coolant can be drawn into or discharged from the heat exchanger 710.

Figure 15:
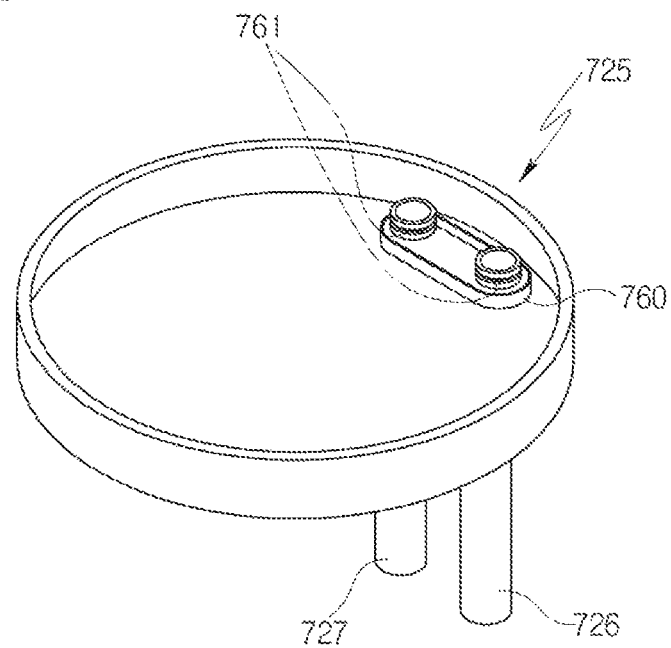
FIG. 15 is a perspective view showing a turned upside down cover of the inner casing shown in FIG. 14.

To couple the inlet pipe 726 and the outlet pipe 727 to the heat exchanger 710, a male and female pair of first and second flanges 750 and 760 are used (refer to FIGS. 9 and 15).

The first flange 750 is mounted to the connection part 711c formed on the upper end of the heat exchanger 710. The first flange 750 is made of aluminum and is brazed on the upper end of the heat exchanger 710. Pipe insert holes 751 and 752 which are connected to the inlet port 711ca and the outlet port 711cb of the connection part 711c are formed in both sides of the first flange 750.

A first bolt hole 753 for bolting with the second flange 760 is formed between the pipe insert holes 751 and 752.

An O-ring 754 is installed on a perimeter of an upper surface of the first flange 750. The O-ring 754 acts between contact surfaces of the first and second flanges 750 and 760 so as to prevent the heat storage material contained in the inner casing 720 from permeating into the flow path of coolant.

The second flange 760 is integrally formed on a lower surface of the inner casing cover 725. The inlet pipe 726 and the outlet pipe 727 are installed in the second flange 760 in such a way that the inlet pipe 726 and the outlet pipe 727 protrude downward from the second flange 760. The inlet pipe 726 and the outlet pipe 727 may be separately manufactured from the second flange 760 and then screw-coupled thereto. Alternatively, the inlet pipe 726 and the outlet pipe 727 may be integrally formed with the inner casing cover 725 and the second flange 760 by injection molding.

A second bolt hole 728 for bolting with the first flange 750 is formed between the inlet pipe 726 and the outlet pipe 727.

An O-ring 761 is installed on a circumferential surface of each of the inlet pipe 726 and the outlet pipe 727 that protrude downward from the second flange 760. The O-rings 761 act between the inlet and outlet pipes 726 and 727 and the corresponding pipe insert holes 751 and 752 so as to prevent coolant passing through the heat exchanger 710 from leaking out of the heat exchanger 710.

Therefore, when the inner casing cover 725 provided with the second flange 760, the inlet pipe 726 and the outlet pipe 727 covers the upper opening of the inner casing 720 after the heat exchanger 710 provided with the first flange 750 is disposed in the inner casing 720, the inner pipe 726 and the outlet pipe 727 are inserted into and connected to the pipe insert holes 751 and 752, thus forming an inlet path and an outlet path for coolant. Thereafter, when bolts are tightened into the first and second bolt holes 753 and 728, the coupling of the first and second flanges 750 and 760 becomes more reliable, whereby the performance of the O-rings 754 and 761 for sealing coolant and heat storage material can be enhanced.

The first flange 750 is made of the same aluminum material as that of the heat exchanger 710. The second flange 760 is made of the same plastic material as that of the inner casing cover 725. Therefore, heat transfer between the first and second flanges 750 and 760 cannot be effectively performed. Thereby, heat loss to the outside of the heat accumulator 700 can be reduced.

Ribs 72 protrude from an outer circumferential surface of the inner casing 720. The ribs 721 are formed in such a way that a plurality of horizontal ribs and vertical ribs are formed at regular intervals and intersect each other. The ribs 721 protrude from the outer circumferential surface of the inner casing 720, thus forming space between the inner casing 720 and a vacuum insulation panel 730. This space can function as space for insulation. The insulation space may be a vacuum. As the insulation performance of the inner casing 720 is enhanced by the insulation space, the heat accumulation performance of the heat accumulator 700 can be improved.

Furthermore, the ribs 721 reinforces the inner casing 720 so that the inner casing 720 can withstand internal pressure resulting from a phase change of a PCM (phase change material; it will be described later herein) charged into the inner casing 720.

Figure 16:
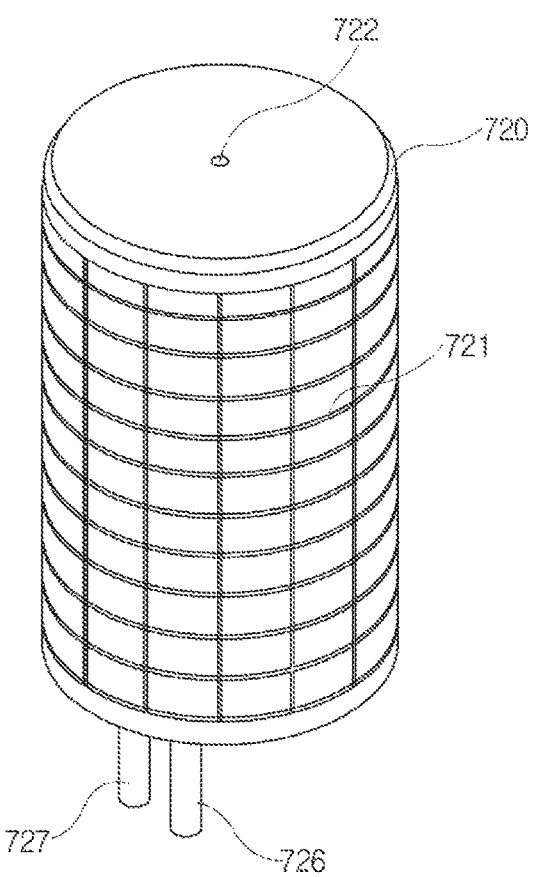
FIG. 16 is a perspective view showing the turned upside down inner casing shown in FIG. 14.

After, as described above, the assembly of the inner casing 720 and the inner casing cover 725 has been completed, the heat storage material is injected into the inner casing 720. As shown in FIG. 16, an injection hole 722 for injection of the heat storage material is formed in a lower surface of the inner casing 720.

As the heat storage material is injected through the injection hole 722, the internal space of the inner casing 720, that is, the space between the heat exchanger 710 and the inner casing 720 is filled with the heat storage material. The heat storage material is completely charged into the spaces between the portions of the cooling fin 712 of each planar tube 711. During the injection of the heat storage material, the injection hole 722 may be used as an air removal hole to make the injection smooth. After the injection of the heat storage material has been completed, a screw is tightened into the injection hole 722, thus sealing the injection hole 722.

PCM (phase change material; storing heat as much as possible using latent heat in a phase change) may be used as the heat storage material.

Figure 17:
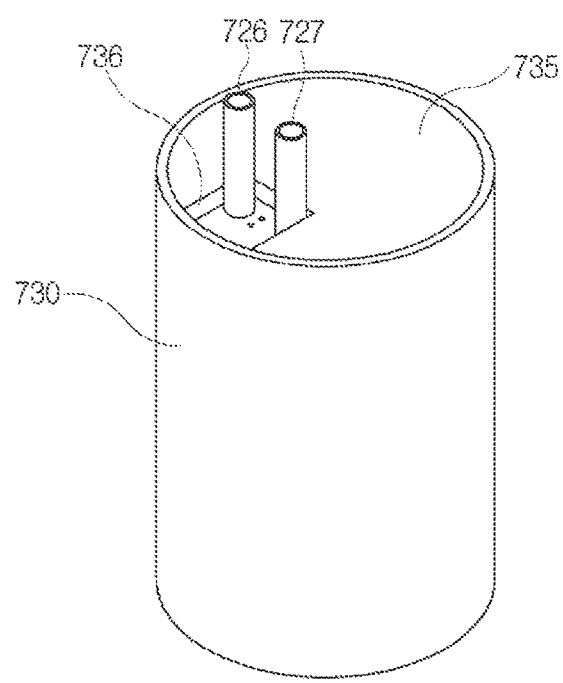
FIG. 17 is a perspective view showing the inner casing of FIG. 14 that is covered with a vacuum insulation panel.

As shown in FIGS. 8 and 17, the assembled inner casing 720 is enclosed by the vacuum insulation panel 730. Generally, a vacuum insulation panel (VIP) is formed of a gas-tight enclosure, in which a core is disposed, and from which the air has been evacuated. Compared to typical insulators, the vacuum insulation panel has a markedly superior insulation effect.

Meanwhile, a vacuum insulation panel cover 735 covers an upper surface of the inner casing cover 725. Here, due to the inlet pipe 726 and the outlet pipe 727, the vacuum insulation panel cover 735 cannot cover the entirety of the upper surface of the inner casing cover 725. That is, there is no choice but to form a cutout portion 736, which surrounds the inlet pipe 726 and the outlet pipe 727, in the vacuum insulation panel cover 735.

The reason for this is because of processing characteristics of the material itself, which is called a vacuum insulation panel, in other words, because it is impossible to manufacture the vacuum insulation panel cover 735 in a precise shape that is capable of completely covering space between the inlet pipe 726 and 727.

Therefore, in order to minimize a non-insulation area (a heat loss area) such as the cutout portion 736, it is preferable that the inlet pipe 726 and the outlet pipe 727 be disposed as close to each other as possible. For this, the inlet port 711ca and the outlet port 711cb are formed as close to each other as possible with the baffle 712a interposed therebetween.

However, contact between the inlet pipe 716 and the outlet pipe 727 must be avoided. The reason for this is due to the fact that because discharge coolant absorbs heat from supply coolant, a rate at which heat is supplied to the heat accumulator is reduced.

Figure 18:
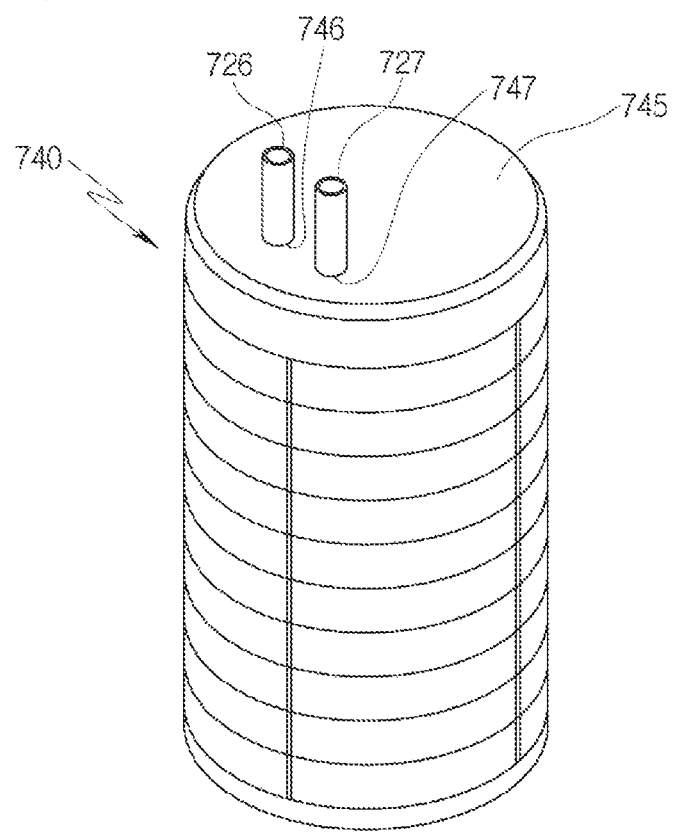
FIG. 18 is a perspective view showing an outer casing in which the inner casing and the vacuum insulation panel shown in FIG. 17 are installed.

As shown in FIGS. 8 and 18, the inner casing 720 enclosed by the vacuum insulation panel 130 is housed in the outer casing 740. The outer casing 740 is also covered with an outer casing cover 745. Two pipe holes 746 and 747 are formed in the outer casing cover 745 to allow the inlet pipe 726 and the outlet pipe 727 of the inner casing 720 to be exposed upward. The outer casing 740 and the outer casing cover 745 are made of plastic.

In this embodiment, the space between the inner casing 720 and the outer casing 740 is filled with the vacuum insulation panel 730 and the vacuum insulation panel cover 735. Alternatively, the space may remain empty rather than being filled with the vacuum insulation panel 730 and the vacuum insulation panel cover 735. In this case, the distance to which the ribs 721 protrude from the surface of the inner casing 720 is increased so that the ribs 721 come into contact with an inner circumferential surface of the outer casing 740, whereby the inner casing 720 can be supported by the outer casing 740. The space between the inner casing 720 and the outer casing 740 functions as an insulation space. Improvement in the heat accumulation performance of the heat accumulator 700 due to enhancement in the insulation performance by the insulation space is as described above. In the case where the insulation space is a vacuum, the insulation performance can be further enhanced.

The vacuum insulation panel 730 and the vacuum insulation panel cover 735 may be respectively and integrally formed in the outer casing 740 and the outer casing cover 745 by insert injection molding. In this case, the assembly of the heat accumulator 700 can be facilitated.

As described above, the heat accumulator 700 according to the present invention absorbs and stores heat from coolant, using the PCM having superior heat storage performance.

The heat exchanger 710 installed for heat exchange between the coolant and the PCM is disposed at the innermost position in the heat accumulator 700 so as to minimize heat loss to the outside.

In particular, since the heat exchanger 710 has a cylindrical shape, the heat loss area can be minimized compared to that of other shapes.

The heat exchanger 710 has the structure in which the planar tubes 711 are stacked on top of one another. The baffle 712a, the circular beads 712b, and the curved bead 712c are formed on each planar tube 711 so that the flow of coolant can be generally uniform and smooth, and a sufficient length of the path along which coolant flows can be ensured. Therefore, the efficiency of heat exchange between the planar tubes 711 and the PCM surrounding them can be enhanced, whereby the heat accumulation performance can be improved.

Furthermore, the cooling fin 712 is provided in the space between the planar tubes 711 so that the efficiency of heat exchange between the planar tubes 711 and the PCM can be further enhanced.

Because the first flange 750 and the second flange 760 that are made of different materials are provided on the junction between the heat exchanger 710 and the inlet pipe 726 and the output pipe 727 of the inner casing cover 725, heat loss caused from the portion on which the inlet pipe 726 and the outlet pipe 727 are installed can be reduced. In the case where not only the second flange 760 but also the inlet pipe 726 and the outlet pipe 727 are integrally formed with the inner casing cover 725 using plastic, heat loss can be further reduced by a reduction in heat transfer rate. Moreover, the number of parts is reduced, whereby the assembly operation of the heat accumulator 700 can be further facilitated.

The first O-ring 754 and the second O-ring 761 are respectively installed to form a double sealing structure at an outer side and an inner side between the first flange 750 and the second flange 760 so that each of the coolant and the PCM can be prevented from permeating into the opposite region.

The inlet port 711ca and the outlet port 711cb of each planar tube 711 are formed as close to each other as possible. Corresponding to this, the inlet pipe 726 and the outlet pipe 727 of the inner casing cover 725 are also disposed close to each other. Therefore, when the vacuum insulation panel cover 735 is installed, the area of a portion that cannot be covered with vacuum insulation material can be minimized.

Hence, heat loss is reduced, and the heat accumulation performance can be enhanced.

Furthermore, an empty space may be formed between the inner casing 720 and the outer casing 740. This empty space functions as an insulation space, thus reducing heat loss of the heat accumulator 700, thereby enhancing the heat accumulation performance of the heat accumulator 700.

Furthermore, the vacuum insulation panel 730 may be installed in the space between the inner casing 720 and the outer casing 740. In this case, heat loss of the heat accumulator 700 is prevented by the vacuum insulation panel 730 having superior heat insulation performance, whereby the heat accumulation performance of the heat accumulator 700 can be further enhanced.

The ribs 721 protrude from the outer circumferential surface of the inner casing 720. The ribs 721 support the inner casing 720 and the outer casing 740 on each other and form space therebetween. In the case where the vacuum insulation panel 730 is installed in this space in the same manner as that described above, the ribs 721 protrude to a degree that they make contact with an inner circumferential surface of the vacuum insulation panel 730. In any case, the fact that a space functioning as an insulation space is formed by the ribs 721 remains the same.

The ribs 721 may be formed in a lattice shape in which a plurality of horizontal members and vertical members intersect with each other. Such ribs 721 function to reinforce the inner casing 720. Therefore, the inner casing 720 can reliably withstand internal pressure that is increased as the PCM contained in the inner casing 720 is expanded in volume by a phase change thereof.

The outer casing 740 is a part which forms an outermost portion of the heat accumulator 700 and functions to protect the vacuum insulation panel 130 from impact.

As described above, the exhaust heat regenerator for vehicles according to the second embodiment of the present invention includes the heat accumulator with further enhanced heat exchange performance and heat accumulation performance. Thus, when the exhaust heat regenerator is installed on a coolant line of a vehicle, it can absorb a large amount of heat from coolant and store it for a long time, and emit a large amount of heat to the coolant when needed. Consequently, the cold start performance and immediately-heating performance can be further enhanced.

While the present invention has been described with respect to the specific embodiments illustrated in the attached drawings, these are only for illustrative purposes, and it will be apparent to those skilled in the art that various changes and modifications may be made without departing from the spirit and scope of the invention as defined in the following claims. Therefore, the spirit and scope of the present invention must be defined by the accompanying claims.

While the present invention has been described with respect to the specific embodiments, it will be apparent to those skilled in the art that various changes and modifications may be made without departing from the spirit and scope of the invention as defined in the following claims.

What is claimed is:

1. An exhaust heat regenerator for a vehicle, comprising:
   a coolant discharge pipe coupled at a first end thereof to an exhaust-heat-recovery heat exchanger and at a second end thereof to a passenger compartment heater;
   a coolant bypass pipe coupled at a first end thereof to a portion of the coolant discharge pipe that is adjacent to the exhaust-heat-recovery heat exchanger and at a second end thereof to a portion of the coolant discharge pipe that is adjacent to the passenger compartment heater;
   a flow path control valve installed on the first or second end of the coolant bypass pipe and configured to control a flow path of coolant;
   a heat accumulator installed on the coolant bypass pipe;
   a first coolant temperature sensor installed on the coolant discharge pipe and measuring a temperature of the coolant discharged from the exhaust-heat-recovery heat exchanger;
   a second coolant temperature sensor installed on the coolant bypass pipe and measuring a temperature of the coolant discharged from the heat accumulator; and
   an electronic control unit controlling operation of the flow path control valve using measured values of the first and second coolant temperature sensors;
   wherein the first coolant temperature sensor is installed on a rear end of the exhaust-heat-recovery heat exchanger and upstream of the flow path control valve;
   wherein the electronic control unit controls the flow path control valve for controlling the coolant passing through the heat accumulator.

2. The exhaust heat regenerator according to claim 1, wherein the electronic control unit determines that the vehicle is in an engine warm-up operation when the measured value of the first coolant temperature sensor is less than the measured value of the second coolant temperature sensor, and controls the flow path control valve such that the coolant discharge pipe is closed and the coolant bypass pipe opens so that all of the coolant passes through the heat accumulator.

3. The exhaust heat regenerator according to claim 1, wherein the electronic control unit determines that the vehicle is in a post warm-up operation when the measured value of the first coolant temperature sensor is equal to or greater than the measured value of the second coolant temperature sensor, and controls the flow path control valve such that the coolant discharge pipe opens and the coolant bypass pipe is closed so that all of the coolant passes through the passenger compartment heater without passing through the heat accumulator.

4. The exhaust heat regenerator according to claim 1, wherein the electronic control unit determines that the vehicle is in a driving operation when the measured value of the first coolant temperature sensor is equal to or greater than a preset thermostat opening temperature, and controls the flow path control valve such that both the coolant discharge pipe and the coolant bypass pipe open so that the coolant flows both through a path that does not passes through the heat accumulator and through a path that passes through the heat accumulator.

5. The exhaust heat regenerator according to claim 1, wherein the heat accumulator comprises:
   a heat exchanger via which the coolant passes;
   an inner casing in which the heat exchanger is installed;
   an outer casing in which the inner casing is installed; and
   a heat storage material charged into a space between the heat exchanger and the inner casing.

6. The exhaust heat regenerator according to claim 5, further comprising:
   an insulation space formed between the inner casing and the outer casing.

7. The exhaust heat regenerator according to claim 5, further comprising:

a sealing member installed on an upper end of an opening of the outer casing, the opening being formed to allow the inner casing to be installed in the outer casing.

8. The exhaust heat regenerator according to claim 5, wherein an inlet port and an outlet port of the heat exchanger protrude outward through a cover of the outer casing.

9. The exhaust heat regenerator according to claim 5, wherein a heat storage material injection port formed on the inner casing protrudes outwards through a cover of the outer casing.

10. The exhaust heat regenerator according to claim 1, wherein the heat accumulator comprises:
- a heat exchanger via which the coolant passes;
- an inner casing in which the heat exchanger is housed;
- a heat storage material charged between the heat exchanger and the inner casing;
- an outer casing housing the inner casing therein; and
- an insulation space formed between the inner casing and the outer casing,
- wherein the heat exchanger comprises a plurality of planar tubes stacked to communicate with each other, each of the planar tubes comprising an upper plate and a lower plate.

11. The exhaust heat regenerator according to claim 10, wherein a cooling fin is formed between the planar tubes.

12. The exhaust heat regenerator according to claim 10, wherein a connection part including an inlet port and an outlet port protrudes from each of the upper and lower plates and of the planar tubes, and
- wherein upper and lower ones of the planar tubes are stacked in such a way that the connection parts are connected to each other.

13. The exhaust heat regenerator according to claim 12, wherein a baffle is formed on each of the planar tubes, the baffle blocking a space between the inlet port and the outlet port.

14. The exhaust heat regenerator according to claim 13, wherein a plurality of circular beads are formed in both spaces of the planar tube that are partitioned from each other by the baffle.

15. The exhaust heat regenerator according to claim 14, wherein a curved bead is formed in the planar tube at a junction between both spaces of the planar tube that are partitioned from each other by the baffle.

16. The exhaust heat regenerator according to claim 10, wherein a tap and a fixing depression into which the tap is inserted are respectively formed in the upper plate and the lower plate of the planar tube.

17. The exhaust heat regenerator according to claim 12, wherein
- a first flange is formed on an upper surface of the heat exchanger, the first flange including pipe insert holes and connected to the inlet port and the outlet port, and
- a second flange is formed on a lower surface of an inner casing cover covering an upper opening of the inner casing, the second flange including an inlet pipe and an outlet pipe,
- wherein the first flange and the second flange are coupled to each other during an assembly of the inner casing cover and form a coolant inlet path and a coolant outlet path.

18. The exhaust heat regenerator according to claim 10, wherein a vacuum insulation panel enclosing the inner casing is installed in the insulation space.

19. The exhaust heat regenerator according to claim 18, wherein a rib protrudes from an outer circumferential surface of the inner casing, the rib coming into contact with an inner circumferential surface of the vacuum insulation panel or an inner circumferential surface of the outer casing.

20. An exhaust heat regenerator for a vehicle, comprising:
- a coolant discharge pipe coupled at a first end thereof to an exhaust-heat-recovery heat exchanger and at a second end thereof to a passenger compartment heater;
- a coolant bypass pipe coupled at a first end thereof to a portion of the coolant discharge pipe that is adjacent to the exhaust-heat-recovery heat exchanger and at a second end thereof to a portion of the coolant discharge pipe that is adjacent to the passenger compartment heater;
- a flow path control valve installed on the first or second end of the coolant bypass pipe and configured to control a flow path of coolant;
- a heat accumulator installed on the coolant bypass pipe;
- wherein the heat accumulator comprises:
- a heat exchanger via which the coolant passes;
- an inner casing in which the heat exchanger is housed;
- a heat storage material charged between the heat exchanger and the inner casing;
- an outer casing housing the inner casing therein; and
- an insulation space formed between the inner casing and the outer casing; wherein the heat exchanger comprises a plurality of planar tubes stacked to communicate with each other, each of the planar tubes comprising an upper plate and a lower plate wherein a connection part including an inlet port and an outlet port protrudes from each of the upper and lower plates and of the planar tubes; and
- wherein upper and lower ones of the planar tubes are stacked in such a way that the connection parts are connected to each other wherein a baffle is formed on each of the planar tubes, the baffle blocking a space between the inlet port and the outlet port.

* * * * *